Aug. 30, 1932.  J. F. BROCE  1,874,694
COMPRESSION CHECK DEVICE
Filed Jan. 26, 1927  2 Sheets-Sheet 1
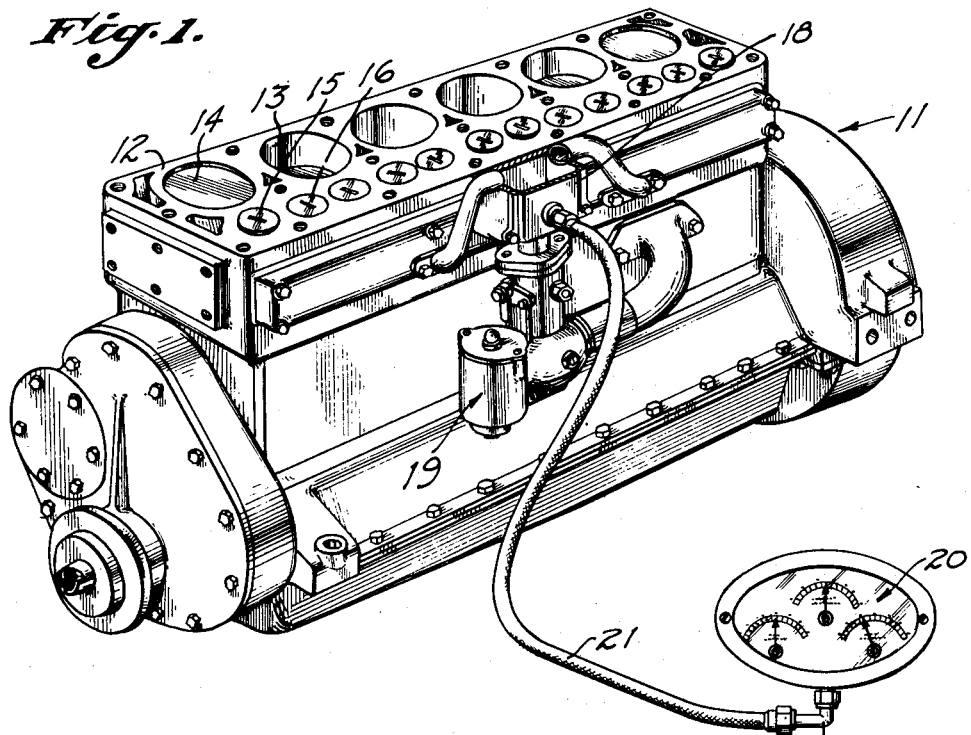
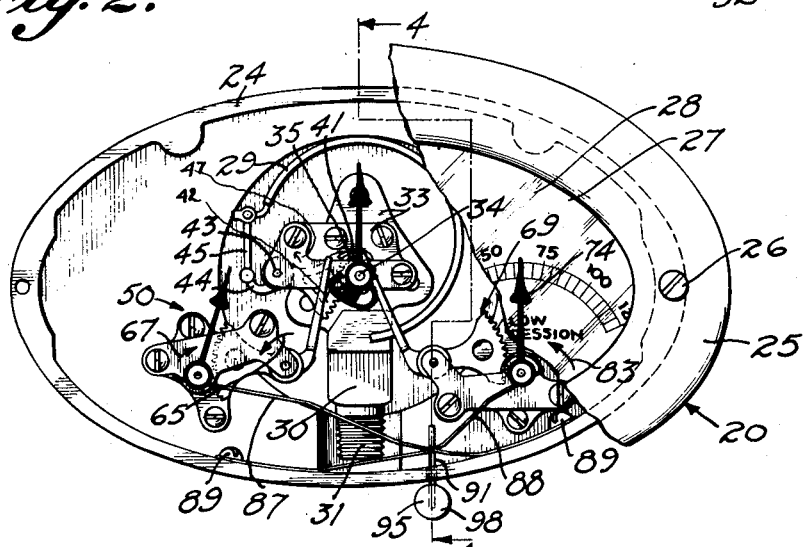
INVENTOR:
JOSEPH F. BROCE,
BY Fad W Manie
ATTORNEY.

Aug. 30, 1932.  J. F. BROCE  1,874,694
COMPRESSION CHECK DEVICE
Filed Jan. 26, 1927   2 Sheets-Sheet 2

INVENTOR
JOSEPH F. BROCE,
BY
ATTORNEY.

Patented Aug. 30, 1932

1,874,694

UNITED STATES PATENT OFFICE

JOSEPH F. BROCE, OF LOS ANGELES, CALIFORNIA

COMPRESSION CHECK DEVICE

Application filed January 26, 1927. Serial No. 163,590.

This invention relates to the automotive industry, and it relates particularly to a novel device for and method of testing the compression of internal combustion engines.

Motor trouble causing lack of power may be divided into two classes; ignition deficiencies and compression deficiencies. It is ordinarily very difficult to find the cause of lack of compression in a motor unless a complete investigation is made.

It is an object of my invention to provide a device whereby the compression of the motor may be very readily and easily checked.

Lack of compression may result from many things. It may be scored cylinders, worn rings or leaky valves. With ordinary garage equipment it is very often impossible to tell which one of these troubles is present and causing the lack of compression.

It is another object of this invention to provide a device whereby the cause of lack of compression may be readily traced. Almost always in an internal combustion engine the compression of the different cylinders is different. One cylinder may show a fairly good compression, whereas another cylinder may show a very poor compression.

It is an object of this invention to provide a compression testing device in which the instantaneous compression, the high compression, and the low compression are all registered.

Still a further object of my invention is to provide a novel method of testing the compression of an engine by measuring the amout of vacuum created by a plurality of pistons operating in the cylinders of said engine.

Other objects and advantages of the invention will be made evident hereinafter.

Referring to the drawings:

Fig. 1 is a perspective view illustrating the utility of the invention.

Fig. 2 is a face view, partly sectional, of the indicator of the invention.

Figure 3:
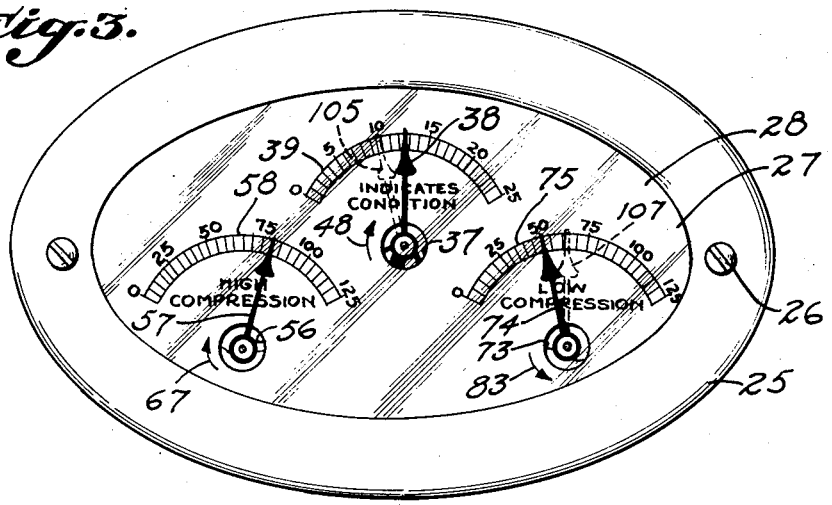
Fig. 3 is a face view of the indicator showing the dial thereof.

Referring in detail to the drawings and particularly to Fig. 1, 11 represents a motor having the head thereof removed. The motor has a block 12 providing cylinders 13 in which pistons 14 operate. Each of the cylinders 13 is provided with intake and exhaust valves 15 and 16. Connected to the passages which the intake valves 15 close is an intake or suction manifold 18 which is connected to a carburetor 19.

My invention includes an indicating device 20 which is connected to the intake manifold 18 by a flexible hose 21.

With reference to Figs. 2 to 6 inclusive I will describe the details of the indicating device 20 of the invention. The numeral 24 represents a shell having a cover 25 secured to the front thereof by screws 26. The cover 25 supports a face-plate 27 and a protective glass 28. Inside the shell 24 is a circular spring-tube 29, one end of which is connected to a stud 30. The stud 30 has a threaded end 31 whereby it may be attached to a connection 32 to which the hose 21 is attached. Supported in the shell 24 inside the spring-tube 29 are spaced plates 33 which rotatably support an arbor 34. Surrounding and engaging the arbor 34 is a hair-spring 35 which resiliently retains the arbor in a certain position. One end of the arbor extends through an opening 37 in the face-plate 27 and has a pointer 38 connected thereto which indicates on a dial 39. The hair-spring 35 is adapted to resiliently retain the arbor so that the pointer 38 indicates zero on the dial 39. A pinion 41 is carried by the arbor 34 between the plates 33 and is engaged by a gear-sector 42, this gear-sector 42 being pivoted on a shaft 43. Connected to the free end of the spring-tube 29 and a lever 44 of the gear-sector 42 is a link 45. When a vacuum is created in the spring-tube 29 the free end moves downward so that the link 45 operates the gear-sector 42. The gear-sector 42 swings on its pivot in a direction indicated by the arrow 47 of Fig.

2, which causes the arbor and the pointer 38 to move in an opposite direction, as indicated by the arrows 48 of Fig. 3. The mechanism, just described, is operated by the instantaneous pressure which exists in the intake manifold 18, and if this pressure fluctuates, the pointer 38 will likewise fluctuate. The dial 39 reads in inches of vacuum.

Adapted to be operated by the mechanism, just described, is a high compression indicating mechanism 50. This mechanism is shown in detail in Fig. 6. The numeral 52 represents plates which are mounted in the shell 24, these plates being separated a certain distance by spacers 53. An arbor 54 is rotatably supported by the plates 52, this arbor having a hair-spring 55 which resiliently retains it in a certain position. The front end of the arbor 54 extends through an opening 56 of the face-plate 27 and has a high compression pointer 57 secured thereto. The high compression pointer 57 indicates on a high compression dial 58 which reads in pound-pressure per square inch. A pinion 59 is secured to the arbor 54, this pinion being engaged by a gear-sector 60. The gear-sector 60 has a shaft 61 which is rotatably supported by the plates 52. Extending from the gear-sector 60 is a primary cam follower 62 which engages a primary cam 63 carried by the arbor 34 of the instantaneous or condition indicating mechanism of the invention. The primary cam 63 is so formed that when the arbor 34 moves in a direction indicated by the arrow 48, a pressure is exerted by the primary cam 63 against the primary cam follower 62. This causes the gear-sector 60 to swing in a direction indicated by the arrows 65 of Figs. 2, 5, and 6. The pointer 57 through the interconnecting mechanism is caused to swing in an opposite direction or in a direction indicated by the arrows 67 of Figs. 2, 3, 5, and 6.

Also mounted in the shell 24 is a low compression indicating mechanism 69. The low compression indicating mechanism 69 is substantially the same construction as the high compression indicating mechanism 50 except that it is right-hand instead of left-hand. It includes plates 70 which are supported in the shell 24 and separated apart in the same manner as the plates 52 of the mechanism 50. An arbor 71 is rotatably supported by the plates 70 and is resiliently maintained in a certain position by a hair-spring 72. The front end of the arbor 71 extends through an opening 73 formed in the face-plate 27, and a low compression pointer 74 is mounted on the end thereof. The pointer 74 indicates on a dial 75 which reads in pound-pressure per square inch. Mounted on the arbor 71 is a pinion 76 which is engaged by a gear-sector 77. The gear-sector 77 has a shaft 78 which is rotatably supported by the plates 70. Extended from the gear-sector 77 is a secondary follower 79 which is adapted to be engaged by and operated by a secondary cam 80 secured to the arbor 34 adjacent to the primary cam 63. When the pointer 38 moves in a direction opposite to that indicated by the arrow 48, the secondary cam 80 engages the secondary follower 79 and swings the gear-sector 77 in the direction of the arrow 82. This causes the pointer 74 to rotate in a direction indicated by the arrow 83 of Figs. 2 and 3.

The hair-spring 35 is provided for the purpose of resiliently retaining the pointer 38 so that it indicates zero on the dial 39. The hair-spring 55 of the high compression indicating mechanism 50 resiliently retains the pointer 57 so that it indicates zero on the dial 58. The hair-spring 72 operates differently from the other two hair-springs. This hair-spring 72 is provided so that it exerts a resilient twist on the arbor 71 which tends to cause the pointer 74 to indicate the highest possible pressure. It will be seen, however, upon an inspection of Fig. 5 that the arbor 71 can only be rotated by the hair-spring 72 in a direction opposite to that indicated by the arrow 83 until the secondary follower 79 comes into engagement with the secondary cam 80.

The arbors 54 and 71 are prevented from being operated by the hair-springs 55 and 72 by retainer springs 87 and 88 respectively, which are secured in the housing 24 by screws 89. These retainer springs engage the arbors 54 and 71 and frictionally prevent them from rotating. The amount of friction of the retainer springs 87 and 88 is sufficient to prevent the hair-springs from rotating them, but is not sufficient to prevent the arbors and the pointers from being moved when the primary and secondary cams 63 and 80 engage either of the arms 62 or 79. The retainer springs may be released from engagement with the arbors 54 and 71 by the operation of a release member 91, at which time the hair-springs will return the mechanisms into such positions that the followers will move into engagement with the cams if they are out of engagement. The release member 91 is L-shaped and the inner end 92 thereof extends forward in the shell 24 so as to engage both of the retainer springs 87 and 88. An arm 93 of the release member 91 extends outward through a slot 94 and has a plunger 95 connected thereto by means of a pin 96. The plunger 95 extends forward through an opening 97 in the cover 25 and has a knob 98 on the front end thereof. The release member 91 fulcrums on an adjustable screw 100. When the plunger 95 is depressed the inner part 92 of the release member 91 is swung downward so that the retainer springs 87 and 88 will move from engagement with the arbors 54 and 71.

The operation of my invention is substantially as follows:

The motor 11 to be tested is started and is run at a very slow rate of speed, preferably at a slow idling speed. As the pistons 14 operate in the cylinders 13, a suction is placed on the intake manifold 18 so that a gas-air mixture is drawn into the upper ends of the cylinders. A suction by means of the flexible hose 21 is placed on the interior of the spring-tube 29 which causes the free end thereof to move downward. The instantaneous indicating mechanism is operated, as previously explained, so that the pointer 38 moves into the position shown in Figs. 1, 2, and 3, which indicates the inches of vacuum in the intake manifold 18. If each piston creates the same suction, the pointer 38 will not fluctuate but will remain in the position shown; however, if the suction is different, due to leaky valves, leaky rings, or any other reason, when this piston is depressing on the intake stroke, the suction though the intake manifold 18 will be less and the pointer 38 will move into a position indicated by dotted lines 105 of Fig. 3. As the motor operates then, it will be seen that the pointer 38 moves according to the instantaneous suction which is placed on the intake manifold 18 and therefore will register what is denominated the condition. When the pointer 38 moves into the position indicated by full lines in Figs. 1, 2, and 3, the primary cam 63 engages the primary follower 62 and moves the pointer 57 into the position indicated by full lines in Figs. 1, 2, and 3. This movement is caused against the action of the hair-spring 55 and against the action of the retainer spring 87. The high compression pointer 57 will not move in the direction opposite to the arrow 67 when the pointer 38 moves from full line position into dotted line position (Fig. 3) because of the fact that the retainer spring 87 frictionally holds it in the position shown.

Figure 5:
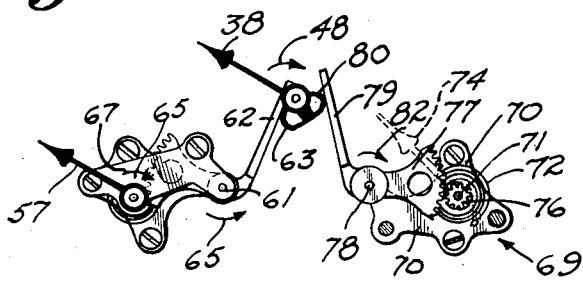
Fig. 5 is a fragmentary view showing the mechanism for operating the pointers of the invention.
Figure 4:
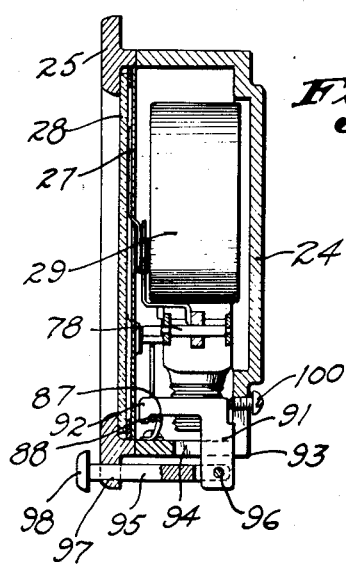
Fig. 4 is a section taken on the line 4—4 of Fig. 2.
Figure 6:
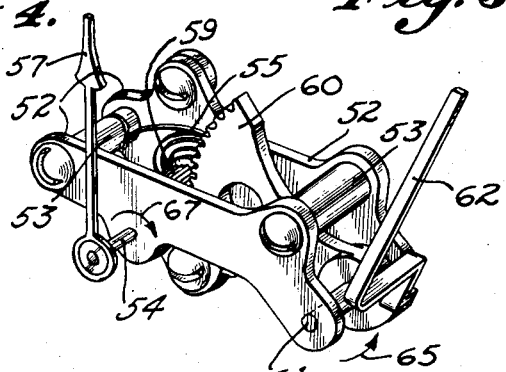
Fig. 6 is an enlarged perspective view of one of the indicating mechanisms of the invention.

The low compression pointer 74 is not moved at this time by reason of the fact that when the pointer 38 moves in the direction indicated by the arrow 48 the secondary cam 80 moves away from the follower 79, the retainer spring 88 holding the low compression mechanism in substantially the position shown in Fig. 5. The low compression pointer 74 at this time indicates zero and, of course, is incorrect. The operator then depresses the plunger 95 and releases the retainer springs 87 and 88. The hair-spring of the high compression mechanism moves this mechanism so that the primary follower 62 engages the primary cam 63. The hair-spring 72 of the low compression mechanism 69 moves this mechanism in an opposite direction so that the secondary follower 79 engages the secondary cam 80. At this time both of the followers are engaging their respective cams. The plunger 95 is released, and the retainer springs 87 and 88 again engage the arbors 54 and 71, frictionally retaining the mechanisms in a certain position. If the compression of the motor is uniform, the pointer 38 will not fluctuate, and the low and high compression pointers 57 and 74 will both point to the same pressure on their respective dials. If the suction in the manifold 18 fluctuates so that the pointer moves from full line position into dotted lines position 105 (Fig. 3), the readings of the high and low compression pointers will be different. Let us consider that the pointer 38 is in full line position. As the suction in the intake manifold decreases, the pointer will move to the position indicated by dotted lines 105. When it moves in that direction the primary cam 63 moves away from the primary follower 62. The high compression mechanism 50 does not operate, however, because of the engagement of the retainer spring 87. The secondary cam 80 at this time engages the secondary follower 79 and swings it in a direction indicated by the arrow 82 of Fig. 5. This movement is against the action of the hair-spring 72 and the retainer spring 88. The low compression pointer 74 will at this time move from a position indicated by dotted lines 107 in Fig. 3 into full line position. When the pointer 38 moves back to full line position in Fig. 3, the secondary cam 80 moves from engagement with the secondary follower 79, but the low compression mechanism 69 will not operate because of the retainer spring 88. The pointers 57 and 74 will not be disturbed subsequent to this setting unless the suction increases or decreases more than is indicated by the full and dotted line position of the pointer 38 in Fig. 3. This is because of the fact that neither of the mechanisms can be operated unless the follower thereof is engaged by a cam. To cause a cam to engage a follower, the high or low position of the pointer 38 must be exceeded.

So far I have explained the manner in which the high and the low compressions of the motor are indicated on the different dials of the compression testing device 20. It is possible by observation of the movement of the pointer 38 to determine what is the cause of the loss of compression. If the loss of compression in any cylinder is caused by a leaky valve, the movement of the pointer 38 will be very quick and jerky. If the trouble is a scored cylinder or piston, the pointer 38 will move slowly between its two extreme positions. If the pistons 14 have leaky rings, the compression of all of the cylinders will be low and the high and low compressions indicated on the dials will be below the average. The cylinder which is low in compression may be readily traced by interfering with the operation of one of the valves of this cylinder. If the operator holds a valve of the wrong cylinder from operation, the motion of the pointer 38 will increase and will change its nature. It will have a double jerk which might be termed a compound motion. When the low compression cylinder is reached, a lifting of the valve thereof will not cause a compound motion of the pointer 38 but will merely cause it to move a greater distance.

From the foregoing description it should be apparent that my invention is so designed that the compression of a motor may be easily and quickly tested. The invention absolutely eliminates all guess-work, and when it is found that compression in the motor varies, the cause of the loss of compression for the cylinder in which the loss of compression exists may be quickly traced in the manner previously described. The mechanism in the device 20 is positive in operation and is of simplified design so that it is not liable to disorders.

I claim as my invention:

1. In a compression check device of the class described, the combination of: condition indicating mechanism; means for connecting said condition indicating mechanism to a vacuum space of a motor; high compression indicating mechanism connected to said condition indicating mechanism; and low compression indicating mechanism connected to said condition indicating mechanism.

2. A combination as defined in claim 1 in combination with: retaining means for holding said high compression indicating mechanism in a position to indicate the high compression of said motor, and for holding said low compression indicating mechanism in a position to indicate the low compression of said motor.

3. A combination as defined in claim 1 in which said high compression indicating mechanism includes: a pointer for indicating the high compression of said motor; and high compression pointer operating mechanism connected to said pointer and to said condition indicating mechanism.

4. A combination as defined in claim 1 in which said low compression indicating mechanism comprises: a low compression pointer adapted to indicate the low compression of said motor; and low compression pointer operating mechanism connected to said low compression pointer and to said condition indicating mechanism.

5. In a compression check device of the class described, the combination of: condition indicating mechanism; means for connecting said condition indicating mechanism to a vacuum space of a motor; high compression indicating mechanism connected to said condition indicating mechanism; low compression indicating mechanism connected to said condition indicating mechanism; retaining means for holding said high compression indicating mechanism in a position to indicate the high compression of said motor, and for holding said low compression indicating mechanism in a position to indicate the low compression of said motor; and a release means for releasing said retaining means.

6. A combination as defined in claim 1 in which said high compression indicating mechanism includes: a high compression pointer for indicating the high compression of said motor; a primary follower adapted to operate said high compression pointer; and a primary cam connected to said condition indicating mechanism, said primary cam driving said primary follower.

7. A combination as defined in claim 1 in which said low compression indicating mechanism comprises: a low compression pointer adapted to indicate the low compression of said motor; a secondary follower adapted to operate said low compression pointer; and a secondary cam connected to said condition indicating mechanism, said secondary cam driving said secondary follower.

8. A combination as defined in claim 1 in which said high compression indicating mechanism includes: a high compression pointer for indicating the high compression of said motor; and high compression pointer operating mechanism connected to said pointer and to said condition indicating mechanism, said high compression pointer operating mechanism including means for resiliently holding said high compression pointer at a maximum indicating position.

9. A combination as defined in claim 1 in which said low compression indicating mechanism comprises: a low compression pointer adapted to indicate the low compression of said motor; and low compression pointer operating mechanism connected to said low compression pointer and to said condition indicating mechanism, said low compression pointer operating mechanism including means for resiliently holding said low compression pointer at a minimum indicating position.

10. A combination as defined in claim 1 including means for holding said high compression indicating mechanism in a maximum indicating position, and including means for holding said low compression indicating mechanism in a minimum indicating position.

11. A combination as defined in claim 1 including means for holding said high compression indicating mechanism in a maximum indicating position, and including means for holding said low compression indicating mechanism in a minimum indicating position; and means for releasing said high and said low compression indicating mechanisms.

12. A combination as defined in claim 1 in which said high compression indicating mechanism includes: a high compression pointer for indicating the high compression of said motor; high compression pointer operating mechanism connected to said pointer and to said condition indicating mechanism, said high compression pointer operating mechanism including means for resiliently holding said high compression pointer at a maximum indicating position; and means for releasing said high compression pointer.

13. A combination as defined in claim 1 in which said low compression indicating mechanism comprises: a low compression pointer adapted to indicate the low compression of said motor; low compression pointer operating mechanism connected to said low compression pointer and to said condition indicating mechanism, said low compression pointer operating mechanism including means for resiliently holding said low compression pointer at a minimum indicating position; and means for releasing said low compression pointer.

14. In a maximum recording device, the combination of: an instantaneous indicating mechanism, said mechanism carrying a cam; a follower adapted to engage said cam, said follower carrying a gear-sector; an arbor carrying a maximum indicating device; a pinion on said arbor engaging said gear sector; and retaining means for holding said maximum indicating device to indicate the maximum amount of movement of said instantaneous indicating mechanism.

15. In a maximum recording device, the combination of: an instantaneous indicating mechanism, said mechanism carrying a cam; a follower adapted to engage said cam, said follower carrying a gear-sector; an arbor carrying a maximum indicating device; a pinion on said arbor engaging said gear sector; retaining means for holding said maximum indicating device to indicate the maximum amount of movement of said instantaneous indicating mechanism; and means for releasing said maximum indicating service.

16. In a maximum recording device, the combination of: an instantaneous indicating mechanism, said mechanism carrying a cam; a maximum indicating device; a follower engaging said cam and operating said maximum indicating device; and pressural means engaging said maximum indicating device adapted to hold same in a position to indicate the maximum amount of movement of said instantaneous indicating mechanism.

17. In a maximum recording device, the combination of: an instantaneous indicating mechanism, said mechanism carrying a cam; an arbor carrying a maximum indicating device; a follower engaging said cam and operating said maximum indicating device; a hair spring on said arbor, moving same in a direction as to hold said follower against said cam; and a retainer spring frictionally bearing against said arbor, said retainer spring being of sufficient strength to keep said hair spring from moving said arbor.

18. In a maximum recording device, the combination of: an instantaneous indicating mechanism, said mechanism carrying a cam; an arbor carrying a maximum indicating device; a follower engaging said cam and operating said maximum indicating device; a hair spring on said arbor, moving same in a direction as to hold said follower against said cam; a retainer spring frictionally bearing against said arbor, said retainer spring being of sufficient strength to keep said hair spring from moving said arbor; and means for disengaging said retaining spring and said arbor.

19. In a device for recording maximum and minimum values, the combination of: an instantaneous indicating mechanism; primary and secondary cams carried by said instantaneous indicating mechanism; a maximum indicating device actuated by said primary cam, said maximum indicating device recording the maximum reading of said instantaneous indicating mechanism; and a minimum indicating device actuated by said secondary cam, said minimum indicating device recording the minimum reading of said instantaneous indicating mechanism.

20. In a device for recording maximum and minimum values, the combination of: an instantaneous indicating mechanism; primary and secondary cams carried by said instantaneous indicating mechanism; a maximum indicating device actuated by said primary cam, said maximum indicating device recording the maximum reading of said instantaneous indicating mechanism; a minimum indicating device actuated by said secondary cam, said minimum indicating device recording the minimum reading of said instantaneous indicating mechanism; and means for resetting said maximum and said minimum indicating devices.

21. In a device for recording maximum and minimum values, the combination of: an instantaneous indicating mechanism; primary and secondary cams carried by said instantaneous indicating mechanism; a maximum indicating device carried by a primary arbor; a primary follower engaging said primary cam and operating said maximum indicating device; a hair spring on said primary arbor tending to move same in a direction as to hold said primary follower in engagement with said primary cam; a primary retainer spring frictionally bearing against said primary arbor; a minimum indicating device carried by a secondary arbor; a secondary follower engaging said secondary cam and operating said minimum indicating device; a hair spring on said secondary arbor tending to move same in a direction as to hold said secondary follower in engagement with said secondary cam; a secondary retainer spring frictionally bearing against said secondary arbor, said primary and said secondary retainer springs being of sufficient strength to prevent said hair springs from moving their respective arbors; and means for releasing said primary and said secondary retainer springs from engagement with said primary and said secondary arbors respectively.

22. A method of testing the condition of a multi-cylinder internal combustion engine having a plurality of pistons, one piston operating in each cylinder, and an intake space through which each of said cylinders intakes, which comprises: measuring the instantaneous fluctuations of the vacuum placed on said intake space through the operation of each of said pistons, the character of said fluctuations giving an indication of the type of leakage taking place in said engine; measuring the maximum amount of vacuum placed on said space as an indication of the maximum compression obtainable in the best of said cylinders; and measuring the minimum amount of vacuum placed on said space as an indication of the compression obtainable in the poorest of said cylinders.

23. In a compression check device, the combination of: condition indicating mechanism; means for connecting said condition indicating mechanism to a vacuum space of a motor; and high compression indicating mechanism connected to said condition indicating mechanism.

24. In a compression check device, the combination of: condition indicating mechanism; means for connecting said condition indicating mechanism to a vacuum space of a motor; and low compression indicating mechanism connected to said condition indicating mechanism.

25. A method of determining cylinder leakages in an internal combustion engine, which comprises: operating the engine at an idling speed so that each piston during its intake stroke impresses a vacuum on the intake manifold of said internal combustion engine; measuring the suction created in said manifold by each of said pistons during its intake stroke, said internal combustion engine being operated sufficiently slow that the vacuum produced by each of said pistons at different positions thereof during each intake stroke may be measured; and observing the fluctuations in vacuum produced in said intake manifold by each of said pistons so as to determine the character of the cylinder leakages in any of the cylinders of said internal combustion engine.

26. In a method of determining cylinder compression and cylinder leakages of a multi-cylinder internal combustion engine which has a plurality of cylinders with pistons operating therein and an intake manifold connected to said cylinders, the steps of: operating said engine at such a slow speed that the pistons on their intake stroke produce distinct vacuum conditions in said intake manifold of said engine; successively measuring the amount of vacuum produced in said intake manifold by each piston during its intake stroke; and measuring the maximum vacuum produced in said intake manifold during the test.

27. In a method of determining cylinder compression and cylinder leakages of a multi-cylinder internal combustion engine which has a plurality of cylinders with pistons operating therein and an intake manifold connected to said cylinders, the steps of: operating said engine at such a slow speed that the pistons on their intake stroke produce distinct vacuum conditions in said intake manifold of said engine; successively measuring the amount of vacuum produced in said intake manifold by each piston during its intake stroke; and measuring the minimum vacuum produced in said intake manifold during the test.

In testimony whereof, I have hereunto set my hand at Los Angeles, California, this 21st day of January, 1927.

JOSEPH F. BROCE.